United States Patent Office 3,795,730
Patented Mar. 5, 1974

3,795,730
CARBON ADSORPTION-REDUCTION PROCESS FOR NITRIC OXIDES
John Joseph Kalvinskas, 354 S. Spring St., Suite 400, Los Angeles, Calif. 90013
Filed Mar. 29, 1971, Ser. No. 128,918
Int. Cl. C01b 5/00, 21/00; B01g 9/04
U.S. Cl. 423—239                    3 Claims

ABSTRACT OF THE DISCLOSURE

Nitrogen oxides are adsorbed from gas mixtures containing them by adsorbent carbon in which there is dispersed intermetallic metal or metal oxide at a temperature of about 100° C., and subsequently reduced at a temperature of about 300° C., with recycling for reuse the adsorbent materials.

SUMMARY

Figures 1, 2:
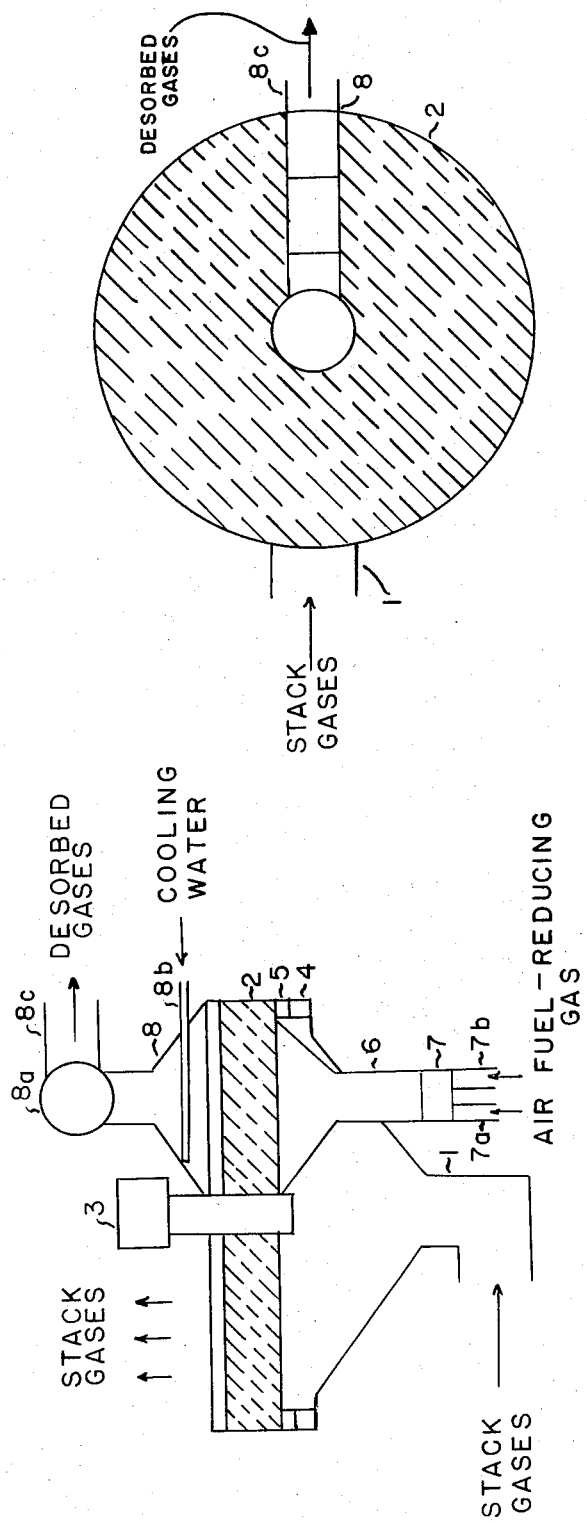

The objective of the invention is to provide a low cost process for the removal and disposal of nitric oxides from large volumes of diluent gases such as combustion gases from fossil-fueled power plants.

The invention combines a low cost carbon material with a catalyst for low temperature nitric oxide reduction with either a specific nitric oxide reductant, ammonia, or a general reducing agent, i.e.; hydrogen, carbon monoxide, hydrocarbons.

The invention provides for the use of an adsorbent, carbon, that has an extremely high affinity for nitric oxide adsorption with a means of economically recovering and recycling the carbon adsorbent.

The invention avoids the use of high temperature nitric oxide desorption that seriously impairs the recycle and reuse of carbon adsorbent. Instead the invention provides a low cost process that extends the process life of the carbon adsorbent with a low temperature reduction-desorption process for nitric oxides removal from the carbon adsorbent.

PROCESS DRAWING

FIG. 1 is an elevation view of a rotary fixed bed reactor 2 that provides for carbon adsorption of nitric oxides from stack gases 1 combined with a bed treatment section, inlet and outlet gas ducts 6, 8, for low temperature reduction of the adsorbed nitric oxides to nitrogen and water and attendant desorption. The inlet gas duct 6 to the bed includes a burner for bed preheat to obtain the requisite reducing temperature, 200–300° C., followed by injection of reducing gases for nitric oxide. Desorbed gases can be collected in the exit duct 8 for recovery or directly vented to the atmosphere.

FIG. 2 provides a plan view of the rotary fixed bed reactor.

DETAILED DESCRIPTION

A process has been invented (FIG. 1) for elimination of nitric oxides from combustion gases stemming from fossil fuel combustion and other sources wherein nitric oxides are present in large volumes of diluent gases.

The process takes advantage of the known high adsorptive capacities of carbon materials, such as char and activated carbon, for nitric oxides (ref. 1). The carbon adsorption will remove the nitric oxides from the large volume of diluent gases by passage of the gases through a bed of carbon which can be a fixed or fluid bed, and concentrate the nitric oxides on the carbon surface at up to 1.5 weight percent of the carbon (ref. 1). The carbon adsorption is accomplished at low temperatures, preferably below 100° C., to enhance the nitric oxide adsorption on the carbon surface.

The nitric oxide saturated carbon is removed from the flowstream of diluent gases. In the process flowsheet, FIG. 1, this is accomplished by baffling of the stack gas flow from the reduction-desorption zone. The separation of the carbon bed from the stack gases for carrying out the reduction-desorption operation can be accomplished in many ways without departing from the spirit of the invention.

The carbon used in the nitric oxide adsorption is specially prepared to include a dispersion throughout the carbon bed of metal particles and/or metal salts that will promote the low temperature reduction, below 300° C., of nitric oxides to nitrogen and water. With ammonia as a specific reducing agent for nitric oxides, platinum group metals (ref. 2), vanadium V, molybdenum VI, and tungsten VI oxides (ref. 3) and a catalyst of 85% FeIII oxides, 10% Cr III oxide and 2% Cr VI oxides (ref. 4) can be used for low temperature (200–300° C.) reduction of the nitric oxides. A wide variety of other metals including copper and copper oxide can also be used to promote the low temperature, less than 300° C., reduction reaction of nitrile oxides using reducing agents such as hydrogen, carbon monoxide, hydrocarbons, etc. (ref. 5–9).

The low temperature, below 300° C., reduction of nitric oxides adsorbed on carbon is an integral part of this invention. Temperatures in excess of 300° C. are normally required for nitric oxide desorption from carbon (ref. 1, 10). At temperatures in excess of 300° C., carbon will ignite and/or degrade in the presence of oxidizing agents (ref. 1) which seriously interferes with the practical recycle and reuse of carbon materials for nitric oxide adsorption. This invention of combining low temperature catalytic reduction with the carbon adsorption of nitric oxides provides for the first time a practical approach to the use of the high adsorptive capacities of carbon for nitric oxides. The invention also permits the use of metal catalysts of relatively low activity to be effective in the process, since the invention practices the nitric oxide reduction reaction to nitrogen and water in the absence of large volumes of diluent gases intially present with the nitric oxides. The presence of large volumes of gases during the practice of the nitric oxides reduction will dilute the concentration of reducing agent and will seriously limit the reaction time available for the nitric oxide reduction, thus requiring extremely active nitric oxide reduction catalysts. This invention allows the use of catalysts and reducing conditions of low activity in the practice of the reduction-desorption of adsorbed nitric oxides. The economic and process benefits enjoyed by the acceptance of catalysts of low activity in the practice of the invention are numerous and include the useful extension of catalyst life in the practice of this invention as well as the use of the carbon as a substrate for the catalyst as opposed to more desirable substrates if high catalyst activity were mandatory for successful prosecution of this invention.

The separation of the nitric oxides reduction reaction from the large volume of diluent gases also eliminates competitive oxygen reactions for the reducing agent and eliminates attendant oxygen deactivation of catalytic surfaces that promote the low temperature nitric oxides reduction (ref. 11).

This invention can be practiced in the presence of sulfur oxides in the combustion gases, requiring only an adjustment in the process conditions to accept a reduced adsorption capacity of carbon for nitric oxides in the presence of sulfur oxides. The sulfur oxides will also be removed from the combustion gases by adsorption on the carbon surface. The sulfur oxides can be removed by the reduction-desorption reaction where the sulfur oxides are reduced and removed as sulfur and/or hydrogen sulfide depending on the reduction conditions practiced. The use of ammonia which is a specific reducing agent for nitric oxides, provides for the selective reduction of nitric oxides without a corresponding reduction of sulfur oxides.

The invention is further described with reference to the accompanying drawing, FIG. 1, which is a diagrammatic illustration of process equipment for application of the invention. The illustration, FIG. 1, does not preclude other process equipment applications which are within the scope of this invention.

As illustrated in FIG. 1, stack gases are directed to an expanded duct 1 that directs the gases to a bed of granular carbon 2 that includes metal catalysts dispersed through the bed for promoting low temperature nitric oxide reduction. The bed is contained in a circular metal enclosure with a porous metal bottom support plate that allows the passage of gases through the bed but supports the granular carbon bed. The top of the carbon bed can be open with direct venting to the atmosphere or can be enclosed for venting to a stack. The carbon bed enclosure is suspended on ball bearings 5 for electric motor drive rotation 3 on a circular track 4. Stack gases pass through the carbon bed with nitric oxides adsorbed from the stack gases onto the granular carbon surface. The stack gases admitted to the bed can be precooled directly with water spray injection or indirectly through a waste heat economizer to lower excessive gas temperatures and increase nitric oxides adsorption on the carbon surface. Gas velocities and carbon bed depth are minimized to reduce the attendant pressure drop through the bed. Typical values for gas flow velocities through the bed are 50 feet per minute and a typical bed depth is 3 feet for a 0.2 p.s.i. pressure drop although the invention application is not confined to these design limits.

On rotation, the bed is designed to intersect a reduction-desorption section that consists of a gas inlet duct 6 directed to the bottom of the bed. A burner 7 operates with an air 7a and fuel 7b mixture for preheating the bed. After preheating, gases 7b, i.e.; ammonia, carbon monoxide, hydrogen, hydrocarbons are injected for low temperature reduction of the adsorbed nitric oxides to nitrogen and water. An exhaust duct 8 overlays the bed reducing-desorption section and acts as a receiver for the desorbed gases. The exhaust duct is powdered by a blower 8a, and includes a cooling water spray 8b for cooling the bed for nitric oxide adsorption after desorption is complete. The desorbed gases are directed 8c to an atmospheric vent or gas recovery unit. The reduction-desorption section typically encompasses less than a 5% sectional area of the carbon bed. A complete adsorption-desorption rotation cycle typically encompasses a 2 hour period. Rotational speed can be adjusted to correspond to nitric oxide adsorption levels experienced on the carbon surface. The lower the allowable nitric oxide concentration buildup on the carbon surface, the shorter will be the adsorption time cycle and corresponding rotational time cycle. Isolation of the bed for reduction-desorption occurs by rotation of the bed past the inlet gas duct which baffles stack gases from this section of the bed. A correspondence of gas pressures between the adsorption and bed reduction-desorption section will minimize lateral flow of gases without benefit of vertical baffling in the bed. The carbon bed is fixed with no significant movement of carbon granules which will reduce attrition of the carbon granules normally experienced in a moving bed. Although not shown, provision can be introduced for a continuous carbon bed recycle and/or replacement or a periodic total recycle and/or replacement. Bed dumping can be managed by hinged bottom bed sections to a disposal chute. Bed loading can be accomplished by an overhead conveyor. FIG. 1 depicts an elevation view and FIG. 2 a plan view.

This invention claims:

1. A process for adsorbing nitrogen oxides from gases containing them, and subsequently reducing said nitrogen oxides to nitrogen and water, which comprises contacting said gases containing nitrogen oxides with adsorbent carbon in which is dispersed a material selected from the group consisting of platinum group metals, copper, copper oxide, vanadium V, molybdenum VI, and tungsten VI oxides, and a catalyst of 85% iron III oxides, 10% chromium III oxides, and 2% chromium VI oxides at a temperature below 100° C., subsequently reducing the adsorbed nitrogen oxides to nitrogen and water with a reducing agent selected from the group consisting of ammonia, carbon monoxide, hydrogen, and hydrocarbon gases at a temperature below 300° C., and recycling the adsorbent for reuse.

2. A process according to claim 1 in which the material dispersed in the adsorbent carbon is selected from the group consisting of copper and copper oxide.

3. A process according to claim 1 in which the adsorbed nitrogen oxides are reduced to nitrogen and water by a reducing agent selected from the group of reducing agents consisting of carbon monoxide, hydrogen and hydrocarbon gases.

References Cited
UNITED STATES PATENTS

| | | | |
|---|---|---|---|
| 2,578,674 | 12/1951 | Daniels et al. | 23—157 R |
| 2,632,528 | 3/1953 | Berg et al. | 23—220 |
| 2,910,343 | 10/1959 | Childers et al. | 23—220 |
| 3,008,796 | 11/1961 | Andersen et al. | 23—220 |

OSCAR R. VERTIZ, Primary Examiner

H. S. MILLER, Assistant Examiner

U.S. Cl. X.R.

55—68, 252—447; 423—351, 580